United States Patent [19]
Wyss

[11] Patent Number: 6,125,453
[45] Date of Patent: Sep. 26, 2000

[54] CUT SET-BASED RISK AND RELIABILITY ANALYSIS FOR ARBITRARILY INTERCONNECTED NETWORKS

[75] Inventor: Gregory D. Wyss, Albuquerque, N. Mex.

[73] Assignee: Sandia Corporation, Albuquerque, N. Mex.

[21] Appl. No.: 09/109,236

[22] Filed: Jun. 30, 1998

[51] Int. Cl.$^7$ .................................................. G06F 15/16
[52] U.S. Cl. .............................. 714/1; 709/249; 709/253
[58] Field of Search ............................... 714/1; 709/249, 709/251, 252, 253

[56] References Cited

U.S. PATENT DOCUMENTS 5,426,674   6/1995   Nemirovsky et al. .................. 709/241

OTHER PUBLICATIONS

Wyss, "A Mathematical Foundation for the Development of Cut Sets for Arbitrarily Interconnected Networks," Sandia Report SAND97–1967, UC–705, Aug. 1997.

Wyss, "Probabilistic Risk and Reliability Assessment of Communications Network," presented to CIA and NSA, May 8, 1996.

Wyss, et al., Probabilistic Logic Modeling of Network Reliability for Hybrid Network Architectures, IEEE Confernece on Local Computer Networks, Oct. 13, 1996, Minneapolis, MN.

Wyss, et al., "Information Systems Vulneraability: A Systems Analysis Perspective," presented at American Defense Preparedness Association Joint Security Technology Symposium, Jun. 17, 1996, Williamsburg, VA.

Wyss, et al., "Risk and Reliablity Assessment for Telecommunications Networks," published in the Proceedings of the International Topical Meeting, "Probabilistic Safety Assessment '96'" (an American Nuclear Society Meeting, Sep. 29–Oct. 3, 1996, Park City, Utah.

Wyss, "Risk and Reliability Assessment for Telecommunications Networks," presentation at Probability Safety Assessment '96, Sep. 29–Oct. 3, 1996, Park City Utah.

Ball, "Computational Complexity of Network Reliability Analysis: An Overview," IEEE Transactions on Reliability, vol. R–35, No. 3, Aug. 1986.

Satyanarayana, "Efficient Algorithms for Reliability Analysis of Planar Networks—A Survey," IEEE Transactions on Reliability, vol. R–35, No. 3, Aug. 1986.

Provan, "Bounds on the Reliability of Networks," IEEE Transactions on Reliability, vol. R–35, No. 3, Aug. 1986.

Wood, "Factoring Algorithms for Computing K–Terminal Network Reliability," vol. R–35, No. 3, Aug. 1986.

*Primary Examiner*—Ly V. Hua
*Attorney, Agent, or Firm*—Russell D. Elliott

[57] ABSTRACT

Method for computing all-terminal reliability for arbitrarily interconnected networks such as the United States public switched telephone network. The method includes an efficient search algorithm to generate minimal cut sets for nonhierarchical networks directly from the network connectivity diagram. Efficiency of the search algorithm stems in part from its basis on only link failures. The method also includes a novel quantification scheme that likewise reduces computational effort associated with assessing network reliability based on traditional risk importance measures. Vast reductions in computational effort are realized since combinatorial expansion and subsequent Boolean reduction steps are eliminated through analysis of network segmentations using a technique of assuming node failures to occur on only one side of a break in the network, and repeating the technique for all minimal cut sets generated with the search algorithm. The method functions equally well for planar and non-planar networks.

16 Claims, 3 Drawing Sheets

CUT SET-BASED RISK AND RELIABILITY ANALYSIS FOR ARBITRARILY INTERCONNECTED NETWORKS

GOVERNMENT RIGHTS

The United States Government has rights in this invention pursuant to Contract No. DE-AC04-94AL85000 awarded by the U.S. Department of Energy.

BACKGROUND OF THE INVENTION

1. Field of the Invention

This invention pertains to a method for characterizing networks. More particularly, the invention pertains to a cut set-based method for performing risk and reliability analysis of arbitrarily interconnected networks wherein all-terminal reliability is a factor to be considered in the networks' design and maintenance. The method applies equally well to planar and non-planar networks.

2. Description of the Related Art

During recent years there has been a dramatic increase in the use and importance of networks, generally, and of information and communications systems, specifically, in broad aspects of life. Today it is not unusual for the failure of these systems to result in huge financial losses, and even to threaten property, cause environmental burdens, and endanger of human life. Businesses count on reliable telecommunications systems to transfer time-critical business information, to enable collaboration of employees at distant corporate locations, and to perform financial transactions. Individuals rely on these infrastructures not only for day-to-day communications, but also as a primary means of assuring their health and safety through immediate access to emergency services. Governments use telecommunications services to coordinate actions during times of natural disaster and national emergency. Clearly, the presence of a reliable telecommunications and information transport infrastructure is critical to many aspects of our country's well being.

The networks just described are more and more becoming characterized by nonhierarchical architectures that are arbitrarily interconnected such as the U.S. public switched telephone network presently in use and large-scale asynchronous mode data communications networks which are currently undergoing development. Probabilistic risk and reliability analysis (PRA) methods have been used to assess the reliability of complex electromechanical systems ranging from individual components within automobiles to large precision machine tools, complex semiconductor fabrication facilities, nuclear power reactors, chemical processing plants, aircraft and spacecraft. The reason that PRA methods have not been widely applied to analyze communications networks and other arbitrarily interconnected networks is that the traditional PRA modeling techniques, such as reliability block diagrams, fault trees and event trees result in vast mathematical inefficiencies when applied to such networks. In addition, the derivation of models using these techniques is logically difficult and error-prone for such networks. Traditional techniques for network analysis are designed to examine the root causes and consequences of a single, well-defined failure condition, and can become extraordinarily complex when applied to an all-terminal reliability problem (i.e., "Can everybody on this network talk to everybody else?" ). There can, in fact, be a combinatorial explosion in model complexity as one considers the conditions that can cause loss of connectivity between every possible pair of points in the network. The combinatorial expansion problem causes the use of PRA techniques to become intractable for modeling all but the most rudimentary networks.

Prior attempts to perform reliability analyses for communications and other similar networks have focused on path set theory rather than cut set theory. Briefly stated, path set theory seeks to identify all of the possible paths by which information can pass between two selected points within a network, while cut set theory seeks to identify all of the possible combinations of failures that can prevent information from passing through the network. Path sets have, until now, been the method of choice for network reliability analysis for two main reasons: First, a number of efficient pathing algorithms exist in the literature, and second, the same network will often produce far fewer path sets than cut sets. Thus, it has historically been convenient and efficient to examine network reliability with path sets.

While path sets have historically been easier to generate than cut sets, they are a less useful than cut sets for the purposes of reliability analysis. Importance measures derived from cut sets can provide network design and operations personnel with key information about which network elements are the most important to system reliability and where to direct investment to obtain the most cost-effective network improvement. Unfortunately, these importance measures cannot be derived directly from path sets. This is why a robust network assessment method that is based on cut sets rather than path sets is sought.

BRIEF SUMMARY OF THE INVENTION

Therefore, it is an object of the present invention to provide a method for characterizing nonhierarchical arbitrarily-interconnected networks and to derive importance measures for the elements comprising those networks.

Another object of the invention is to provide a method for characterizing activities or enterprises that can be described as a network, including but not limited to telecommunications and data networks, water distribution systems, electric power grids, road systems and rail transportation systems.

Another object of the invention is to provide a method for distinguishing effects individual elements have on overall network function, and to assist designers or analysts in prioritizing the elements of the network as regards their effect in the event of element failure.

The above and other objects are achieved by the present invention wherein a series of characterizations of segmentations of a network are performed, starting with isolation of a single node, and then progressively "reaching out" and analyzing successive two-part segmentations based on function, applying an exclusive OR logical operation to generate cut sets and Boolean reductions at each stage to avoid duplication of cut sets, until the entire network is categorized in terms of the minimal cut sets needed to segment the network into all possible combinations of two subnetworks. This complete list of minimal functional cut sets is then transformed, using a process of evaluating network segmentations from alternate sides of breaks in the network, to determine every possible combination of individual component failures within the network that can lead to network failure. Probabilities or frequencies associated with individual component failures are then applied to arrive at overall network risk, reliability and other importance measures.

Upon further study of the specification and appended claims, further objects and advantages of the invention will become apparent to those skilled in the art. It should be understood that the detailed description and specific examples, while indicating preferred embodiments of the invention, are given by way of example only, since various changes and modifications within the spirit and scope of the invention will become apparent to those skilled in the art from this detailed description.

DETAILED DISCUSSION

Figure 1:
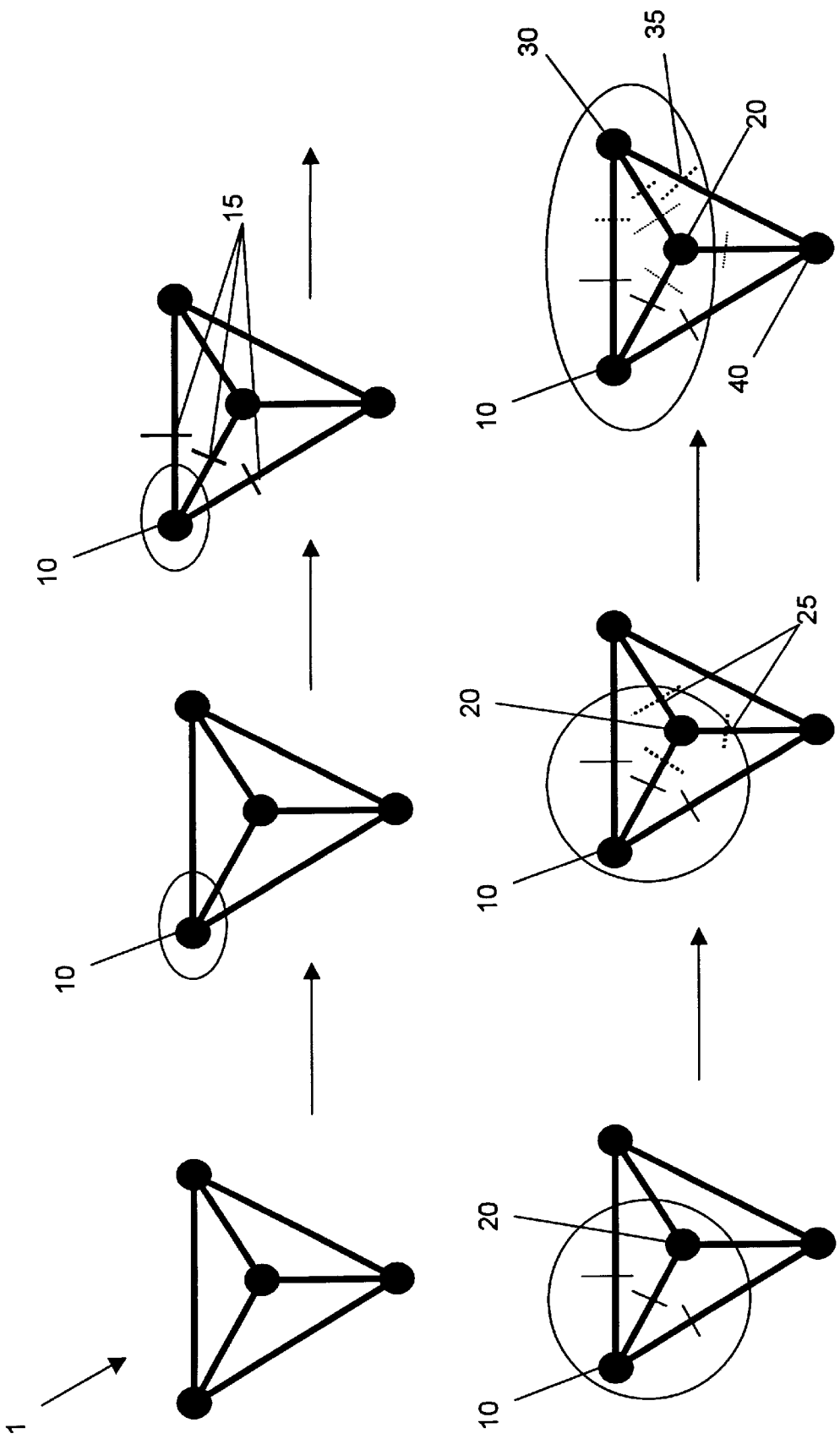
FIG. 1 illustrates schematically an example cut set identification phase of the method of the present invention including the process of "reaching out".

The present invention is best understood when considered to involve at least two primary phases of analysis, described in detail later in this specification. First, however, a discussion of terms is useful. Also, a distinction is made between two different ways to evaluate network elements, and specifically, to evaluate cut sets within a network.

As alluded to earlier in this disclosure, for an arbitrarily interconnected network to be 100% connected (a prerequisite to all-terminal reliability), every node in a network must be able to communicate with every other node in the network. If this condition is not satisfied, the network is said to be segmented. A minimal cut set is defined as the necessary and sufficient combination of failures that must occur at the same time in order to segment the network. In other words, a minimal cut set consists of just enough links that if all were to fail, the network would be segmented. In such an instance, if any link in the cut set does not fail, then the network is not segmented because the cut set consists of the bare minimum group of link failure events that can cause the network to become segmented.

Cut sets can be viewed from both a physical and a functional perspective. At a physical level, each node in a network can be connected to any positive number of links. A link, however, by definition, has only two ends. Therefore, a link is always connected to exactly two nodes. At a functional level, however, a network appears as simply a set of communication corridors wherein each communication corridor is composed of a functional link that transmits data plus a node at each end of the link to interpret and/or route that data. The communication corridor is unable to carry out its intended function if either the functional link itself fails or if one of the nodes at either end of the link fails. Functional corridors can be made up of individual links or of combinations of links and nodes, so long as those links and nodes combine to form a functional link in a corridor having a node at either end. At a functional level, useful analysis of cut sets involves identifying combinations of functional failures that can cause the network to become segmented. In the functional analysis, the physical nodes and links themselves are unimportant except to the degree to which they affect individual communications corridors. As will be seen later in this disclosure, consideration of the network from a functional perspective enables certain mathematical vehicles to be employed for the purpose of simplifying the network characterization problem. Ultimately, though, the results of a functional analysis must at some point be translated into information that is useful to assist in better design and maintenance of actual physical network elements so that the network will serve users' needs in the real world. For this reason Phase I concerns functional analysis of the network and Phase II concerns transformation of the results of that analysis into information pertinent to physical elements of the network and their configuration. A mathematical derivation of the process is presented in Sandia Report No. SAND97-1967, UC-705 entitled "A Mathematical Foundation for the Development of Cut Sets for Arbitrarily Interconnected Networks by Gregory D. Wyss. That Report is herein incorporated in its entirety.

Phase I—Identifying All of the Minimal Cut Sets

In this phase, the network is analyzed to determine the complete set of minimal functional cut sets for the given network architecture. This leads to an understanding of every possible combination of individual component failures within the network that can lead to network failure. Only after this is accomplished, according to the method of this invention, can the overall network's reliability or risk of failure be determined.

The process of Phase I begins with defining the network as a set of nodes with interconnecting links. Starting with the network diagram, cut sets are first identified and then, using the method of the invention, the cut sets are evaluated for minimality.

Referring to FIG. 1, a network diagram is shown depicting a four-node network 1. In this example, all of the nodes are interconnected in the fashion that, in the condition wherein the network is not segmented, each node is capable of communicating with every other node in the network either directly or through other interconnected nodes.

The process begins with the arbitrary selection of a node. In the figure, this first arbitrarily selected node is designated 10. Next, all of the links that must be severed in order to isolate that node from the rest of the network are identified and a record is kept of those links. In the figure, this first identified cut set 15 is the set of network cuts capable of segmenting the network into two parts consisting of node 10 and the remainder of the network. The cut set 15 is minimal, since each of the cuts in the set, shown in the figure as solid straight lines intersecting links, are both necessary and sufficient to segment the network. If any of the links in the cut set were not cut, then node 10 would not be completely isolated, and the network would not be segmented.

Next, the method of Phase I "reaches out" to analyze the situation wherein the first node 10 and another arbitrarily selected node 20, which is linked to the first node, are compared with the remainder of the network. Specifically, a new set is identified that contains all cuts needed to segment the network into two parts, however, this time the parts are the subnetwork consisting of node 10 and node 20 (and the link between them) and the remainder of the larger network. In order to do this, cuts in links are identified that would isolate node 20 from the network as a whole. As shown in the figure, node 20 has three links that would need to be severed to isolate it from the remainder of the network. Cuts in those links are depicted using square dofted lines intersecting the links. This set of all cuts that would isolate node 20 is not, however, a minimal cut set. Rather, since the link between node 10 and node 20 is part of a previously identified cut set 15 it must be disregarded for purposes of identifying the new minimal cut set 25. To accomplish this, cut set 25 is constructed by using a logical "exclusive OR" operation to combine the cuts in cut set 15 with the cuts that would isolate node 20. This operation eliminates from the new cut set 25 any link whose failure is not necessary to produce the described network segmentation. The new minimal cut set 25 therefore includes only those cuts, not previously identified, which are needed to segment the network into the two parts consisting of the node 10-to-node 20 subnetwork and the remainder of the overall network 1. This new cut set 25 is recorded as was the previous cut set 15.

Next, the method "reaches out" again, and performs analyses similar to the one just described. This "reaching out" is repeated as many times as is necessary to consider all possible two part segmentations of the network. Referring to FIG. 1, the next subnetwork in this example to be considered in relation to the remainder of the network includes node 10, node 20, and additionally arbitrarily selected node 30, which is connected to the subnetwork just analyzed. Again, the cuts needed to isolate node 30 are considered. These are shown in the figure as round dotted lines. As done previously, though, an exclusive OR logical operation is performed between the newly identified cuts and those cuts identified during previous steps in the process. This causes some of the cuts to be eliminated from the new minimal cut set 35. A cut in the link between node 10 and node 30 was already identified as being associated with cut set 15. Likewise, a cut in the link between node 20 and node 30 was earlier identified as associated with cut set 25. As a result, the newest minimal cut set 35 consists only of three cuts in this example: the three links that connect node 40 to nodes 10, 20 and 30, respectively.

If one follows the steps described above for all possible connections in the functional network, the method identifies all of the minimal cut sets needed to segment the example four-node subnetwork into two parts. For example, the preceding discussion first "reached out" from node 10 to node 20. One must apply the same procedure when reaching out from node 10 to node 30 and from node 10 to node 40 in order to assure that all minimal cut sets are identified. However, in principal, the identification of the complete set of minimal cut sets is accomplished by starting with an arbitrarily selected single node, and then reaching out, adding one node at a time until all but one remaining node are taken together and considered as a subnetwork.

After each cut set is defined using the exclusive OR operation, a Boolean reduction is performed to ensure true minimality of the cut sets identified. This is necessary because, in some instances, apparently minimal cut sets may be generated that are actually supersets of at least two smaller, truly minimal cut sets. When this Boolean reduction is performed before "reaching out" again, two computationally expensive operations are avoided: 1) the algorithm does not unnecessarily reach out into subnetworks that will only produce non-minimal cut sets, and 2) the need to perform a Boolean reduction over all cut sets at the end of Phase I is eliminated.

It is important to recognize that the Phase I process just described and depicted in the example in FIG. 1 will identify all of the minimal functional cut sets of a given network architecture. Again, the process works equally well for both planar and non-planar networks. Using the principles just described the complete list of minimal links-only functional cut sets can be generated for any network for which an accurate network diagram is available. This completeness is a key feature of the invention and is important to the inference and quantification scheme to be described later in this disclosure. In the following section, a transformation is described wherein these minimal functional cut sets are used to relate to the physical network elements and extract importance measures needed for assessing effects of individual and combined network failures on overall network risk and reliability.

Phase II—Transforming the Functional Cut Sets

Having developed the complete list of minimal functional cut sets (cut sets that are composed only of functional links), we can now work to infer the existence of the cut sets that contain combinations of physical links and nodes. An important feature of such an inference is the following observation: no link can support the transport of data unless the link itself is working and the node at each end of the link is also working. In other words, the function of the link fails if either the link itself fails or the node at either end of the link fails. Thus, each minimal functional cut set can be transformed into a series of physical cut sets by considering all combinations of the links in the cut set failing or the node at either end of each link failing.

This is a combinatorial problem: a cut set that contains n links will be expanded to $3^n$ cut sets that contain combinations of links and nodes. Since this expansion may produce many duplicate and/or non-minimal physical cut sets, the resulting combinations ordinarily would need to be also checked for minimality (again, for example, using a Boolean reduction). This is a time-consuming process (although overall the process is less time-consuming than if the original search to characterize the cut sets had been based on both links and nodes rather than on the functional links-based reaching out method described above in Phase I). It is also computationally extremely expensive and considered to be an order n-squared operation. Aside from a few short cuts that result in incremental reductions in computational effort, it is necessary to compare virtually every combination of physical cut sets derived from the expansion.

The method of the present invention, though, includes a way to further reduce the computational effort required by eliminating altogether both the expansion and Boolean reduction steps mentioned in the previous paragraph. In order to accomplish this the network, and specifically the network segmentation, is considered from a unique perspective: If all node failures are assumed to be on the same side of the break in the network, than one can develop minimal factored mathematical forms that have the following properties:

1) The mathematical forms represent all of the minimal cut sets containing combinations of links and nodes but contain none of the redundant cut sets and very few of the non-minimal cut sets that would be produced through the combinatorial expansion of a links-only cut set (and therefore, computationally expensive Boolean reduction is not required).
2) The mathematical forms can be used to directly quantify the probability or frequency of the cut set and all of the common importance measures (and therefore, the combinatorial expansion into individual cut sets containing combinations of links and nodes is not required).
3) The mathematical forms provide a direct method for the exact quantification of probabilities (unlike the cut sets from combinatorial expansion, which are typically quantified using approximations such as the probabilistic "rare event approximation" or "minimum cut set upper bound" because exact quantification is computationally quite expensive).
4) As long as the search algorithm provides all possible two-part segmentations of the network, the mathematical forms can be shown to include every possible cut set for the overall network.

Even though this method assumes that all node failures occur on the same side of the break in the network, the application of these mathematical forms to every possible two-part network segmentation means that every possible failure will be considered (i.e., every possible physical cut set is implied through these mathematical forms). The cut sets that contain node failures on both sides of a single postulated network break will eventually be found because these cut sets are actually redundant occurrences of cut sets that would otherwise be located given different segmentations of the network.

Figure 2:
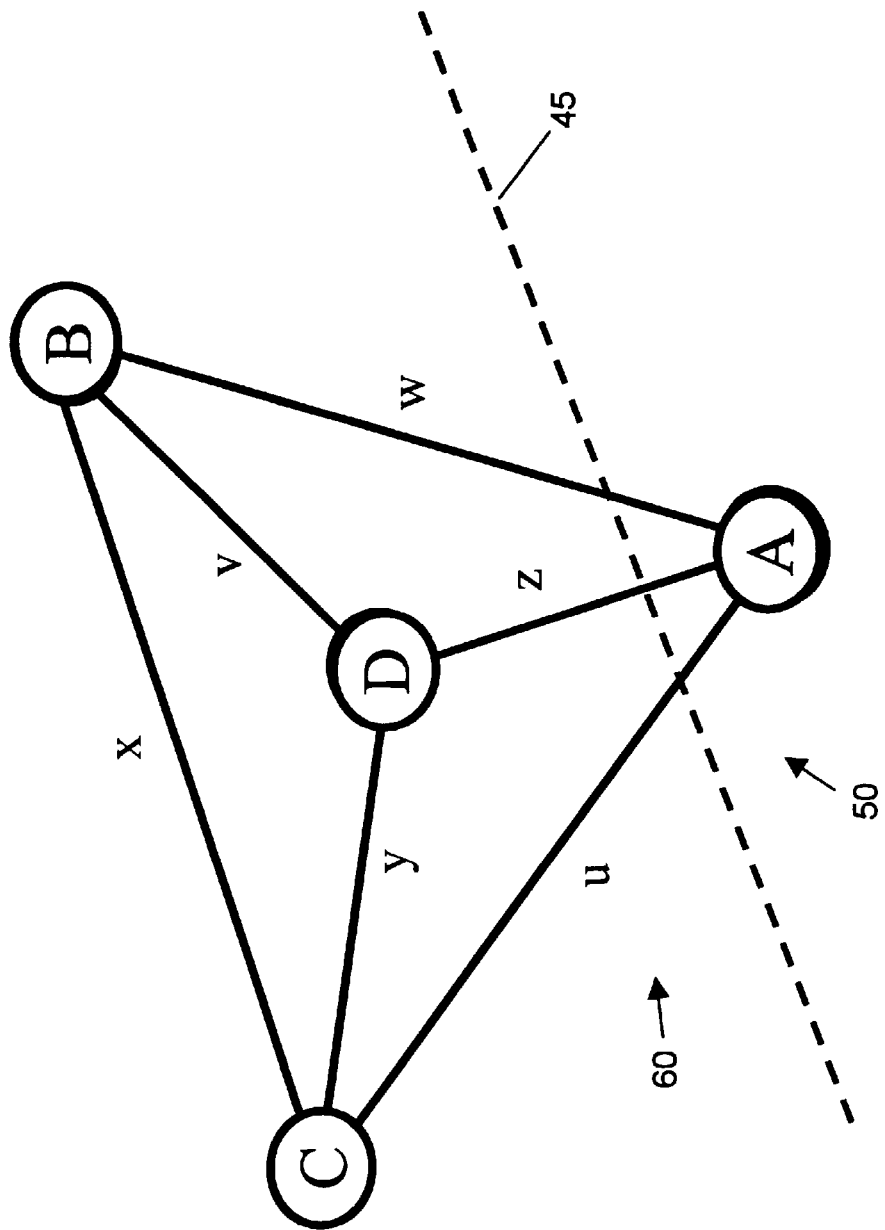
FIG. 2 illustrates schematically various network elements that are considered during the transformation phase of the present invention.

For a comparison of the prior art method of expansion followed by Boolean reduction and the method of the present invention which assumes all node failures occurring on one side of a break in the network, refer to FIG. 2 and the discussion that follows.

In the Figure, a four node arbitrarily interconnected network is depicted wherein the nodes are designated with the letters A, B, C, and D, and links are identified using the letters u, v, w, x, y and z. Also in the figure, and dashed line is drawn to illustrate a break 45 in the network which isolates node A from the remainder of the network. This creates a two-part segmentation wherein the network is divided into a first subnetwork 50 and a second subnetwork 60. The functional cut set (u*z*w) implies that the break 45 segmentation occurs if functionality is lost in link u and link z and link w.

Consider first the situation in which the prior art expansion and Boolean reduction technique is used to characterize the physical cut set associated with the two-part network segmentation depicted in the Figure. According to that methodology, the situation wherein node A is isolated from the remainder of the network can be described using the following mathematical expression:

$$(A+u+C)*(A+z+D)*(A+w+B) \qquad \text{Eq. 1}$$

wherein + signifies a logical OR and * signifies a logical AND. Equation 1 represents the expansion of the functional cut set (u*z*w) in terms of its physical counterpart. In other words, for A to be isolated, every functional link between A and the remainder of the network must fail, and in each instance, the functional link failure could result from failure of the physical link itself or of the node at either end of the physical link (or, in fact, any combination of them). As a consequence of this expansion, however, extra terms are generated which do not contribute valuable information about the network segmentation. These are:

A*u
A*C
A*z
A*D
A*w
A*B

All of these are in fact supersets of A, alone, since each expression includes A. Therefore, if a failure in node A is accounted for at least once, and it is truly necessary and sufficient to segment the network, other combinations of node and link failures including A are superfluous and would need to be eliminated using a Boolean reduction.

Using the Phase II method of the present invention, however, the generation of extra terms can be avoided. As stated previously, all node failures are assumed to be on the same side of the break 45 in the network. Referring to the Figure, begin by evaluating the segmentation from the perspective of the first subnetwork 50. Node A, therefore, is the only node failure of consequence (since nodes B and C, on the opposite side of the break 45 are considered later). The segmentation, viewed from the side of the break 45 on which the first subnetwork 50 is located is described mathematically as follows:

$$A+(u*z*w) \qquad \text{Eq. 2}$$

Next, according to the invention, a similar evaluation of the segmentation is performed from the perspective of the second subnetwork 60, which is located on the opposite side of the break 45. Mathematically, the segmentation is described:

$$(u+C)*(z+D)*(w+B) \qquad \text{Eq. 3}$$

This process of evaluating segmentations first from one side of the break and then from the other side of the break is repeated for every minimal cut set identified in Phase I. By doing this, characterization of all of the physical elements of the network is possible enabling network designers and evaluators to assign risk factors and importance measures directly to the various elements.

The net result is that the risk and importance values for a cut set containing n links can be computed based on two applications of simple formulae per cut set instead of the $3^n$ operations and associated Boolean reduction that would be required under the combinatorial method. This represents substantial savings in both computational effort and computational storage requirements.

Figure 3:
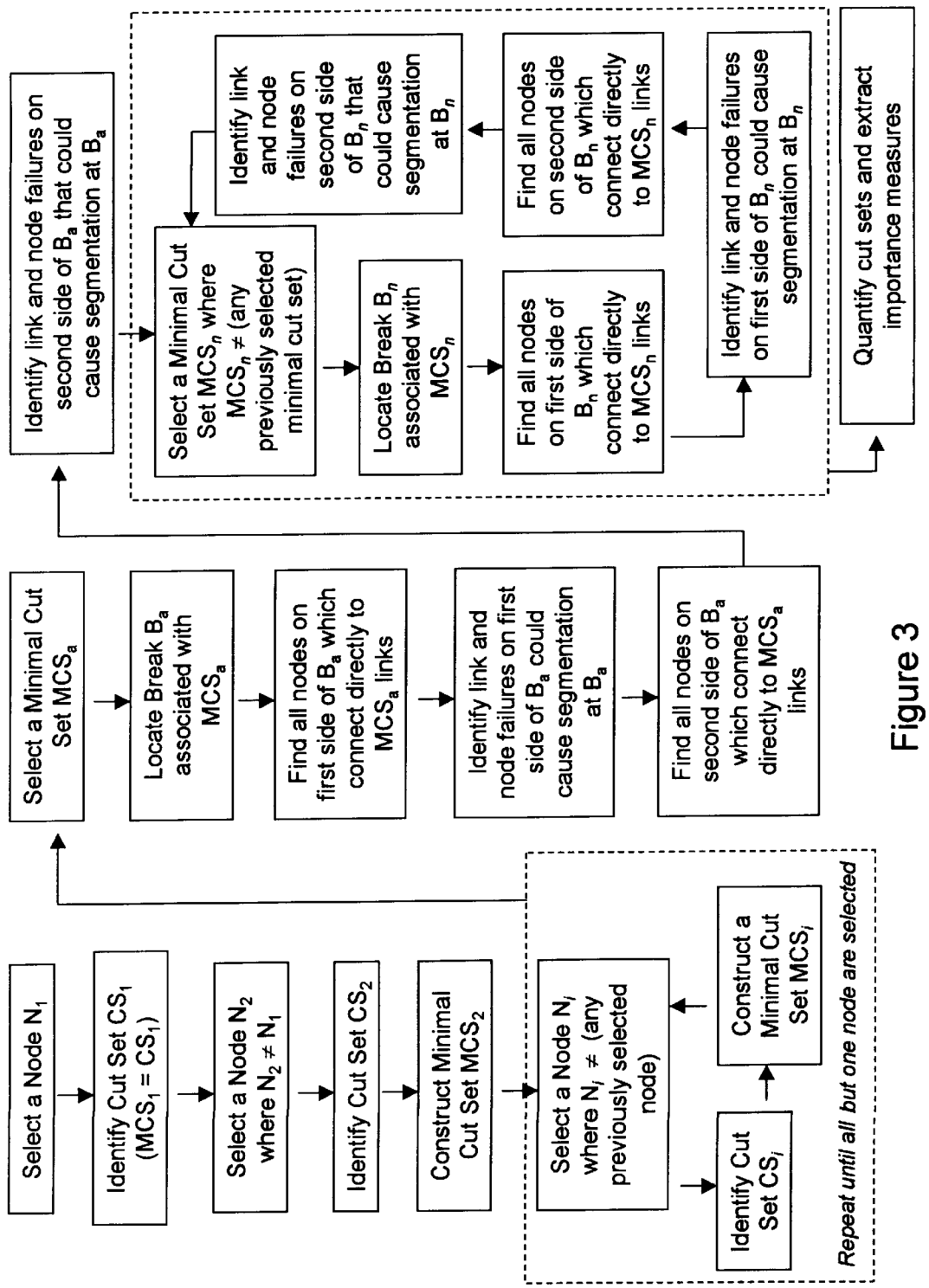
FIG. 3 is a flow chart showing an example of steps to be followed in Phase I and Phase 2 of the method of the invention.

FIG. 3 contains a flow chart illustrating an example of the application of the principles just described with regards to Phase I and Phase II of the method of the invention. As shown in the figure, $N_1$ is an arbitrarily selected node. Any node identified in the network diagram may be the first node. Next, the method proceeds with identifying a cut set $CS_1$ for node $N_1$. For $N_1$, this consists of all links that, if cut, would disconnect node $N_1$ from the remainder of the network. A notable feature of $CS_1$ is that it is also, by definition, a minimal cut set ($MCS_1$). Failure of all of the links terminating at $N_1$ is both necessary and sufficient to segment the network into the two subnetworks $N_1$ and the remainder of the larger network. ($CS_1 = MCS_1$).

Next, as shown in FIG. 3, another node, $N_2$ (linked to $N_1$), is selected. In similar fashion to the steps just performed, the cut set for that node ($CS_2$) is identified. However, $CS_2$ is no longer by definition minimal, and so the minimal cut set ($MCS_2$) for $N_2$ must be constructed. As described above in the discussion of Phase I, this is accomplished by subtracting from $CS_2$ all links that appear in both $CS_2$ and $CS_1$.

Thereafter, the process of a) selecting a node (which is linked to at least one of the previously considered nodes), b) identifying a cut set for each such node, and c) constructing the minimal cut set for each such node, is repeated until all but one remaining node is considered. This last condition, as with the first arbitrarily selected node $N_1$, represents a two-part network segmentation wherein one subnetwork consists of a single node, and the other subnetwork consists of the remainder of the entire network. When this has been accomplished, FIG. 3 illustrates how the process of the invention proceeds to the Phase II transformation, described previously.

As shown in the Figure, a minimal cut set $MCS_a$ is selected and the associated break $B_a$ is identified. For purposes of this characterization, the break is intended to signify the boundary which separates the two sides of the two part segmentation which would be characterized by failure of all of the functional links contained in the minimal cut set $MCS_a$. As shown in the Figure, the process of the invention involves first finding the nodes on one side of the break $B_a$, and locating all links and node failures on that side of the break that could result in that segmentation. Next, a similar evaluation is performed for the other side of the break.

Then, as shown in the Figure, this process of 1) selecting minimal cut sets, 2) finding the breaks associated with the minimal cut sets and, finally, 3) evaluating link and node failures that can give rise to segmentations at the breaks, first from one side of the break and then the other, is repeated until each minimal cut set identified previously in the process is considered.

Finally, as depicted in FIG. 3, these cut sets may be quantified and importance measures can be extracted. These steps are described in the following section.

Quantifying Cut Sets and Extracting Importance Measures

The true value in characterizing networks in terms of cut sets and physical elements lies in being able to quantify cut set expressions in a way that allows network designers and risk analysts to improve networks. This includes being able to answer questions such as: How likely is the network to fail? What are the most likely combinations of events that can lead to system failure? To which primary events is the top event frequency the most sensitive? Which components really matter in the overall reliability of the system? To which components should the most resources be devoted in order to achieve the greatest reliability improvement?

Answers to these and other questions provide a rational basis for decisions about which components in a system to improve or redesign, or alternatively, which elements of the system can be substituted for lower grade components without compromising the desired level of system reliability. Also, information can be obtained about the sensitivity of the overall system to specific component failure, thereby helping to guide decisions about testing and maintenance.

The cut set expressions derived using the method of the present invention do not, by themselves, supply all of the information that is required by risk analysts and network designers. They do, though, permit convenient analysis of networks using independently developed values for risk and reliability as well as probability and frequency associated with events that might impact elements of the system. Also, one can look at the cut sets by themselves (without quantification) to gain some insights, such as which ways of failing the network (represented by cut sets) require the fewest failures and, thus, might bear special scrutiny.

Referring again to Eqs. 2 and 3 above, a frequency or probability can be assigned to each term in the expressions. This allows the analyst to arrive at a frequency or probability for each minimal cut set which in turn allows cut sets to be ranked in terms of likelihood that a given cut set will cause the entire network to fail. By performing this quantification using a minimal factored form as illustrated in Equation 3, and leaving the expression in that minimal factored form, it is possible to determine exactly the overall probability associated with all of the physical cut sets implied by the original functional cut set (exact statistical quantification). However, the minimal factored form can also be quantified using approximations such as rare event approximation and minimum cut set upper bound. Exact quantification would be much more difficult if the minimal factored form were expanded to explicitly obtain each of the physical cut sets. All of the benefit that would be associated with expanding the expression is obtained, and moreover, the result is more accurate and efficient from both a computational and storage standpoint than if the expansion had been performed.

With this information, importance measures can be derived for all of the physical elements in a network. A variety of mathematical tools are available to assist analysts in interpreting importance measures results and using this information to improve networks. The features and operation of such mathematical tools are beyond the scope of this disclosure, but they are known to those skilled in the art of network design and risk analysis. They include risk increase, risk reduction, partial derivative, Fussel-Vesely (FV) measures, Risk Achievement Worth (RAW), Risk Reduction Worth (RRW), and Birnbaum (B) importance.

Having thus described the invention, changes and modifications in the specifically described embodiments can be carried out without departing from the scope of the invention which is intended to be limited only by the scope of the appended claims.

I claim:

1. A method for network characterization comprising the steps of:

a) searching for all minimal functional cut sets in a network having network elements comprising more than two nodes and more than one link which, when functional, connect nodes;

b) transforming said minimal functional cut sets into physical cut sets;

c) applying importance measures to said physical cut sets; and d) characterizing said network using said importance measures applied to said physical cut sets and determining effects of particular network elements and combinations of network elements on overall functionality of said network.

2. The method of claim 1 wherein the step of searching for all minimal functional cut sets comprises selecting a node $N_1$.

3. The method of claim 2 wherein the step of searching for all minimal functional cut sets further comprises identifying a cut set $CS_1$ for node $N_1$ consisting of all links that, if cut, would disconnect node $N_1$ from the remainder of the network, and wherein $CS_1$ is by definition a minimal cut set, $MCS_1$ ($CS_1=MCS_1$).

4. The method of claim 3 wherein the step of searching for all minimal functional cut sets further comprises selecting a node $N_2$ (where $N_2 \neq N_1$) which connects to $N_1$ via at least one link when the network is fully functional.

5. The method of claim 4 wherein the step of searching for all minimal functional cut sets further comprises identifying a cut set $CS_2$ consisting of all links that, if cut, would disconnect node $N_2$ from the remainder of the network.

6. The method of claim 5 wherein the step of searching for all minimal functional cut sets further comprises constructing a minimal cut set $MCS_2$ by subtracting from $CS_2$ all links that appear in both $CS_2$ and $CS_1$.

7. The method of claim 6 wherein the step of searching for all minimal functional cut sets further comprises identification of all remaining minimal cut sets in the network by successively repeating the following steps:

a) selecting a node $N_i$ which is different from all previously selected nodes, but which connects to at least one previously selected node via at least one link when the network is fully functional;

b) identifying a cut set $CS_i$ consisting of all links that, if cut, would disconnect node $N_i$ from the remainder of the network; and c) constructing a minimal cut set $MCS_i$ by subtracting from $CS_i$ all links that appear in both $CS_i$ and any other cut set previously identified until all but one node in the network have been selected.

8. The method of claim 7 wherein the step of transforming said minimal functional cut sets into physical cut sets comprises selecting a minimal cut set $MCS_a$.

9. The method of claim 8 locating where a break $B_a$ in the network occurs if all links in minimal cut set $MCS_a$ fail and cause the network to be segmented into two parts on opposite sides (a first side and a second side) of the break $B_a$.

10. The method of claim 9 wherein the step of transforming said minimal functional cut sets into physical cut sets further comprises identifying all of the nodes on the first side of break $B_a$ that would connect directly to links in the minimal cut set $MCS_a$ if the network were fully functional.

11. The method of claim 10 wherein the step of transforming said minimal functional cut sets into physical cut sets further comprises identifying and recording, in minimal factored form, all combinations of link failures and failures of nodes on the first side of break $B_a$ that could cause the network to be segmented into two parts on opposite sides of the break $B_a$.

12. The method of claim 11 wherein the step of transforming said minimal functional cut sets into physical cut sets further comprises identifying all of the nodes on the second side of break $B_a$ that would connect directly to links in the minimal cut set $MCS_a$ if the network were fully functional.

13. The method of claim 12 wherein the step of transforming said minimal functional cut sets into physical cut sets further comprises identifying and recording, in minimal factored form, all combinations of link failures and failures of nodes on the second side of break $B_a$ that could cause the network to be segmented into two parts on opposite sides of the break $B_a$.

14. The method of claim 13 wherein the step of transforming said minimal functional cut sets into physical cut sets further comprises successively repeating the following steps:

a) selecting a minimal cut set $MCS_n$ which is different from any minimal cut set previously selected during the transforming step;

b) locating where a break $B_n$ in the network occurs if all links in minimal cut set $MCS_n$ fail and cause the network to be segmented into two parts on opposite sides (a first side and a second side) of the break $B_n$;

c) identifying all of the nodes on the first side of break $B_n$ that would connect directly to links in the minimal cut set $MCS_n$ if the network were fully functional.

d) identifying and recording, in minimal factored form, all combinations of link failures and failures of nodes on the first side of break $B_n$ that could cause the network to be segmented into two parts on opposite sides of the break $B_n$;

e) identifying all of the nodes on the second side of break $B_n$ that would connect directly to links in the minimal cut set $MCS_n$ if the network were fully functional;

f) identifying and recording, in minimal factored form, all combinations of link failures and failures of nodes on the second side of break $B_n$ that could cause the network to be segmented into two parts on opposite sides of the break $B_n$.

15. The method of claim 14 further comprising the step quantifying said minimal factored forms using methods selected from the group consisting of: rare event approximation, minimum cut set upper bound, exact statistical quantification, risk increase, risk reduction, partial derivative, Fussel-Vesely measures, risk achievement worth, risk reduction worth, and Birnbaum importance.

16. The method of claim 15 wherein characterization is performed on at least one network selected from the group consisting of telecommunications networks, data networks, water distribution systems, electric power grids, road systems and rail transportation systems.

* * * * *